(12) United States Patent
Laha et al.

(10) Patent No.: US 10,412,624 B2
(45) Date of Patent: Sep. 10, 2019

(54) DYNAMIC POLICY BASED CONTROL FOR AUTONOMOUS TRANSMISSION OF DATA BY IOT OR NON-IOT DEVICE

(71) Applicants: Subhasis Laha, Aurora, IL (US); Padmavathi Sudarsan, Naperville, IL (US); Vasudevan Subramanian, Morristown, NJ (US); Krishna Pramod Adharapurapu, Bangalore (IN); Satish Kanugovi, Bangalore (IN)

(72) Inventors: Subhasis Laha, Aurora, IL (US); Padmavathi Sudarsan, Naperville, IL (US); Vasudevan Subramanian, Morristown, NJ (US); Krishna Pramod Adharapurapu, Bangalore (IN); Satish Kanugovi, Bangalore (IN)

(73) Assignees: Alcatel Lucent, Murray Hill, NJ (US); Nokia of America Corporation, Murray Hill, NJ (US)

( * ) Notice: Subject to any disclaimer, the term of this patent is extended or adjusted under 35 U.S.C. 154(b) by 100 days.

(21) Appl. No.: 15/585,902

(22) Filed: May 3, 2017

(65) Prior Publication Data
US 2018/0324636 A1  Nov. 8, 2018

(51) Int. Cl.
| | | |
|---|---|---|
| *H04W 24/08* | (2009.01) | |
| *H04W 28/02* | (2009.01) | |
| *H04L 29/08* | (2006.01) | |
| *H04L 12/24* | (2006.01) | |

(52) U.S. Cl.
CPC ..... *H04W 28/0289* (2013.01); *H04L 41/0681* (2013.01); *H04L 41/0686* (2013.01); *H04L 41/0893* (2013.01); *H04L 67/12* (2013.01); *H04W 24/08* (2013.01); *H04L 41/0609* (2013.01); *H04L 41/5009* (2013.01); *H04L 41/5067* (2013.01)

(58) Field of Classification Search
CPC ...... H04W 24/08; H04W 4/001; H04L 29/08; H04L 67/327
See application file for complete search history.

(56) References Cited

U.S. PATENT DOCUMENTS

| | | | | |
|---|---|---|---|---|
| 2013/0329632 A1* | 12/2013 | Buyukkoc | ............... | H04W 4/00 370/328 |
| 2016/0087905 A1* | 3/2016 | Liu | .......................... | H04L 67/32 370/236 |
| 2016/0191664 A1* | 6/2016 | Balakrishnan | ........ | H04L 67/306 709/203 |

\* cited by examiner

*Primary Examiner* — Wei Zhao

(57) ABSTRACT

A method includes receiving at least one current network condition factor (NCF), each current NCF indicating a level of congestion of a corresponding network. The method determines that there is an autonomous report to be transmitted and in response determines a policy entry of a policy used for autonomous reporting based on matching values of one or more input parameters related to the autonomous report to values of one or more input parameters of the policy entry. A reference NCF for a first network is determined from the corresponding policy entry. The method then determines whether to request to transmit the autonomous report on the first network based on a comparison of the reference NCF for the first network and the current NCF of the first network.

18 Claims, 6 Drawing Sheets

| Input Parameters | | | | | Treatment | | |
|---|---|---|---|---|---|---|---|
| UE Power to send data over | | Time Sensitivity | Reli-ability | Size of Data | Reference Value of Network Condition Factor (NCF) | | Adjusted Delta Periodicity |
| LTE | WiFi | | | | LTE | WiFi | |
| Low | Low | Mission Critical | * | * | 3 | 3 | 0 |
| Low | High | Mission Critical | * | * | 3 | 3 | 0 |
| High | Low | Mission Critical | * | * | 3 | 3 | 0 |
| High | High | Mission Critical | * | * | 3 | 3 | 0 |
| Low | Low | Time Critical | High | Low | 3 | 3 | 0 |
| Low | High | Time Critical | High | Low | 3 | 1 | 0 |
| High | Low | Time Critical | High | Low | 2 | 3 | 0 |
| High | High | Time Critical | High | Low | 2 | 1 | 0 |
| Low | Low | Time Critical | High | High | 3 | 2 | 0 |
| Low | High | Time Critical | High | High | 3 | 1 | 0 |
| High | Low | Time Critical | High | High | 1 | 2 | 0 |
| High | High | Time Critical | High | High | 1 | 1 | 0 |
| Low | Low | Time Critical | Low | * | 2 | 2 | 0 |
| Low | High | Time Critical | Low | * | 2 | 1 | 0 |
| High | Low | Time Critical | Low | * | 1 | 2 | 0 |
| High | High | Time Critical | Low | * | 1 | 1 | 0 |
| Low | Low | Non-Time Critical | * | Low | 2 | 1 | 0 |
| Low | High | Non-Time Critical | * | Low | 2 | 0 | 0 |
| High | Low | Non-Time Critical | * | Low | 1 | 2 | 0 |
| High | High | Non-Time Critical | * | Low | 1 | 0 | 0 |
| Low | Low | Non-Time Critical | * | High | 1 | 1 | 0 |
| Low | High | Non-Time Critical | * | High | 1 | 0 | 0 |
| High | Low | Non-Time Critical | * | High | 0 | 1 | 0 |
| High | High | Non-Time Critical | * | High | 0 | 0 | 0 |
| N/A | N/A | N/A | N/A | Low | 1 | 1 | 0 |
| N/A | N/A | N/A | N/A | High | 0 | 0 | 0 |
| N/A | N/A | N/A | N/A | N/A | 0 | 0 | 0 |

| Input Parameters | | | | Treatment | |
|---|---|---|---|---|---|
| UE Power to send data over LoRA | Time Sensitivity | Reliability | Size of Data | Reference Value of Network Condition Factor (NCF) for LoRA | Adjusted Delta Periodicity |
| Low | Mission Critical | * | * | 3 | 0 |
| High | Mission Critical | * | * | 3 | 0 |
| Low | Time Critical | High | Low | 3 | 0 |
| High | Time Critical | High | Low | 2 | 0 |
| Low | Time Critical | High | High | 3 | 0 |
| High | Time Critical | High | High | 1 | 0 |
| Low | Time Critical | Low | * | 2 | 0 |
| High | Time Critical | Low | * | 1 | 0 |
| Low | Non-Time Critical | * | Low | 2 | 0 |
| High | Non-Time Critical | * | Low | 1 | 0 |
| Low | Non-Time Critical | * | High | 1 | 0 |
| High | Non-Time Critical | * | High | 0 | 0 |
| N/A | N/A | N/A | Low | 1 | 0 |
| N/A | N/A | N/A | High | 0 | 0 |
| N/A | N/A | N/A | N/A | 0 | 0 |

502 points to the header rows; 504 points to the middle data rows; 506 points to the last three N/A rows.

| Input Parameters | | | | | Treatment | | |
|---|---|---|---|---|---|---|---|
| UE Power to send data over | | Time Sensitivity | Reliability | Size of Data | Reference Value of Network Condition Factor (NCF) | | Adjusted Delta Periodicity |
| LTE | WiFi | | | | LTE | WiFi | |
| Low | Low | Non-Time Critical | * | Low | 2 | 1 | 0 |

| Input Parameters | | | | | Treatment | | |
|---|---|---|---|---|---|---|---|
| UE Power to send data over | | Time Sensitivity | Reliability | Size of Data | Reference Value of Network Condition Factor (NCF) | | Adjusted Delta Periodicity |
| LTE | WiFi | | | | LTE | WiFi | |
| Low | High | Time Critical | High | Low | 3 | 1 | 0 |
| Low | Low | Non-Time Critical | * | Low | 2 | 1 | 0 |

FIG. 7

DYNAMIC POLICY BASED CONTROL FOR AUTONOMOUS TRANSMISSION OF DATA BY IOT OR NON-IOT DEVICE

BACKGROUND

Field of the Disclosure

The present disclosure relates generally to control of uplink transmissions to a network by network devices.

Description of the Related Art

A large number of network devices autonomously report information either triggered by an event or on a periodic basis. The flow of information on the Uplink (UL) from these network devices is unpredictable and not controlled in current network systems, which can overwhelm the network quite easily, resulting in failures. In addition, the waning and waxing of the traffic flow on the uplink from these network devices can degrade network users' Quality of Experience (QoE). While this problem exists in current networks, the issue will be magnified with the continued deployment of Internet of Things (IoT) devices. A massive number of IoT devices will be configured to autonomously report information at periodic intervals or triggered by a condition. One obstacle for deployment of IoT devices by network operators on an existing infrastructure is the Key Performance Indicator (KPI) degradation on non-IoT traffic. Prior methodologies to control and gate the autonomous reporting from a large scale deployement of IoT devices are lacking.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 1 is an example policy table in accordance with some embodiments.

FIG. 5 is an example policy table configured on a Long Range Wide-area (LoRa) device in accordance with some embodiments.

FIG. 6 is a portion of an example policy table matching the input parameters/criteria of an autonomous report contemplated to be transmitted in accordance with some embodiments.

FIG. 7 is a portion of an example policy table matching the input parameters/criteria of an autonomous report contemplated to be transmitted in accordance with some embodiments.

DETAILED DESCRIPTION

Figure 2:
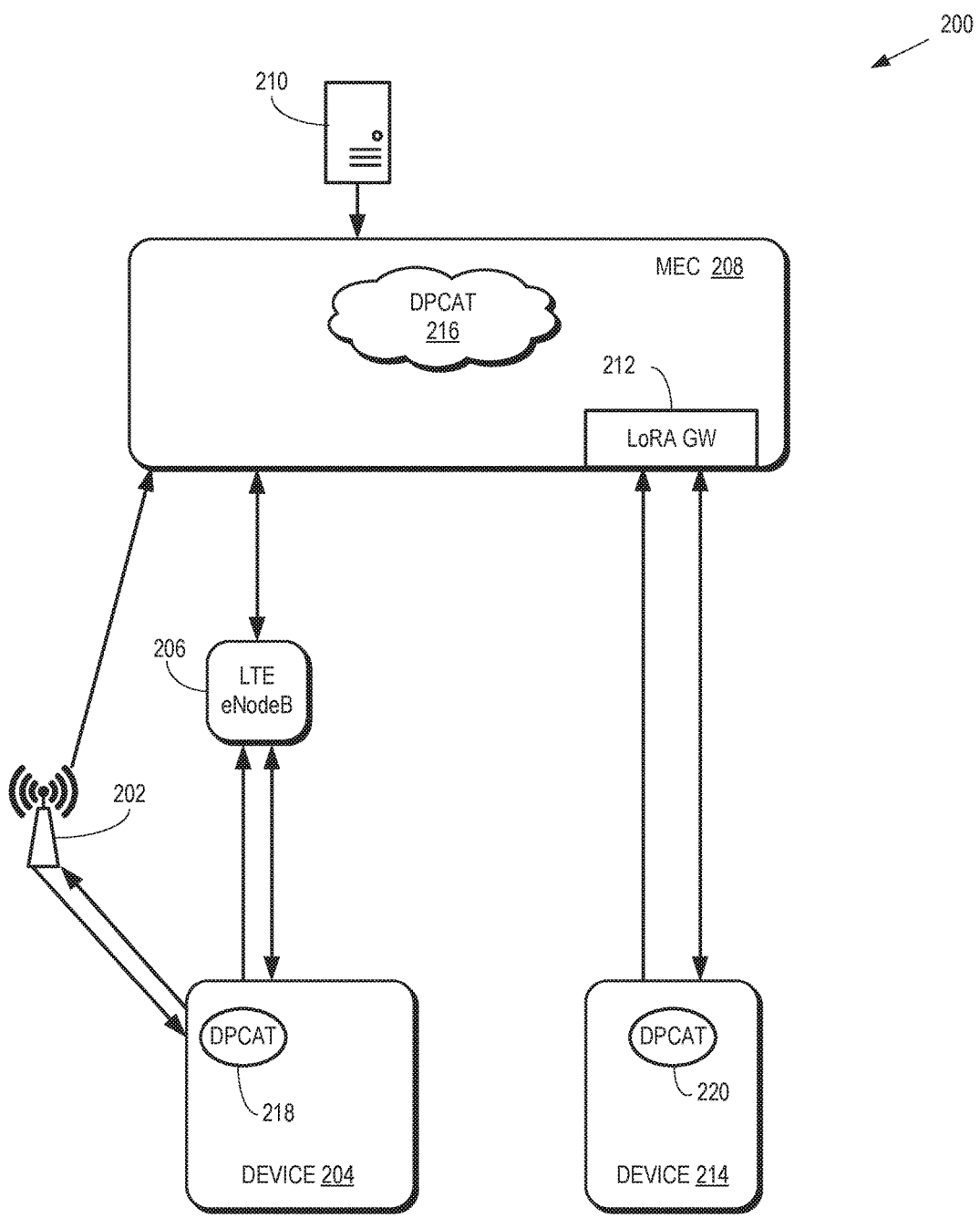
FIG. 2 is a block diagram of a cellular network in accordance with some embodiments.

As the IoT grows, a massive number of IoT devices will be configured to autonomously report information at periodic intervals or triggered by a condition. The flow of information on the uplink from these IoT devices is unpredictable and not controlled currently. As a result, the network on which these IoT devices communicate can be overwhelmed which quite easily can result in network failures. In addition, QoE of all users of the network can be degraded due to the waning and waxing of the traffic flow on the uplink from these IoT devices. An IoT device is defined herein as a communication device that communicates with the network to provide the functionality associated with the IoT application. An IoT application is defined herein as the network-side modules that implement the functionality associated with the IoT application.

Accordingly, one or more embodiments provided herein control and dynamically adapt the communication mechanism allowing autonomous reporting from these communication devices to be driven by network supplied policies that are application characteristics aware. These embodiments result in reduction of battery consumption of the communication devices, efficient utilization of network resources, avoidance of network overload conditions and improved QoE of for users of both IoT and non-IoT applications.

Queries/Requests/Updates/Reports from IoT applications and responses from IoT devices can be categorized into four basic types:
1) an IoT application that sends instruction to IoT device(s);
2) an IoT application that sends a query to an IoT device;
3) a broadcast by an IoT application; and
4) autonomous transmission of information by an IoT device either triggered by an event or on a periodic basis.

For an IoT application that sends instruction to IoT device(s), the communication is a push to the respective IoT device(s). No response or at most an acknowledgement is expected from the respective IoT device(s). The instruction can be small sized (e.g., in bytes) or large sized (e.g., Kbytes/Mbytes).

For an IoT application that sends a query to the IoT device, the query is typically small sized (e.g., in bytes). The expected response from the IoT device may be small sized (e.g., in bytes) or the expected response from the device may be large sized (e.g., Kbytes/Mbytes).

For a broadcast to IoT devices, the IoT application sends an announcement followed by a broadcast of large amount of data to all or a subset of the IoT devices.

For autonomous transmission of information, the IoT device independently transmits data that can be small sized (e.g., in bytes) or large sized (e.g., Kbytes/Mbytes)) and either triggered by an event or on a periodic basis.

It is expected that majority of IoT communication will be of the fourth type (i.e., autonomous transmission of information from the IoT devices). There can be several different types of autonomous responses from the IoT devices. However, the majority of autonomous responses by IoT devices is likely to be one of two types: 1) information reports occurring at intervals (e.g., regular intervals); and 2) information reports triggered by an event.

For devices configured to report information at regular intervals, the information reports can be reported at short intervals (e.g. on the order of minutes or seconds or shorter intervals) to longer-term interval reports (e.g., reported daily, weekly, monthly or after the passage of a longer period of time). Example reports of this type include meter readings reported autonomously every month, health monitor reports sent every few minutes to a central monitoring system, automobiles reporting the health of different components, industrial machines reporting the health/status of different parts and the like. For devices configured for event triggered information report(s), an occurrence of an event can trigger the IoT device to report information. Example reports of this type include water tank leak reporting, hydrology monitoring for alerts during, for example, a time of heavy rain, building monitoring reports for when sensors detect intruders breaking into a facility, vending machines reporting that items have been depleted or run low, monitoring data transmissions by sensors on a bridge when a train passes through the bridge, and the like.

One or more embodiments of the present disclosure define methods or apparatuses to dynamically optimize a policy used for autonomous reporting by IoT devices. The policy takes into account the characteristics of the type of information being reported, the network load and the pattern of reporting to ensure efficient use of network resources while ensuring better user QoS and QoE. One or more embodiments dynamically adapt the autonomous reporting from the IoT devices to be driven by network supplied policies that are application characteristics aware, resulting in reduction of battery consumption of devices, efficient utilization of network resources, avoidance of network overload conditions and better QoE for users of both IoT and non-IoT applications.

A logical entity, named herein a Dynamic Policy based Control for Autonomous Transmission (DPCAT), is defined. When deployed on the network, the DPCAT provides the following functionality:

Initial configuration of the policy table on the devices; details of the contents of the policy table are described below;

Update of the policy table as and when certain network conditions change;

Computation of a current network condition factor (NCF); details of the NCF are described below;

Sending of periodic (e.g., on the order of seconds) update to the IoT devices of the current NCF; and Logic to adapt the policy table: policy table entries related to an adjusted delta periodicity and a reference network condition factor (NCF) (described below) are adapted based on activities in the network and the "learned" patterns of IoT traffic.

FIG. 1 is an example policy table in accordance with some embodiments. A policy table on the IoT device is an ordered list of policies that can be applied by the device when it has data to send autonomously. Parameters/Criteria in the policy table are used to identify particular autonomous reports contemplated to be transmitted and having the specified parameters/criteria. Parameters/Criteria can include time criticalness of the information being reported, reliability required for the data being reported, size of the data being reported, and device power level. Accordingly, when an autonomous report is to be transmitted, a certain time criticalness of the information being reported, a certain reliability required for the data being reported, a certain size of the data being reported, and a certain device power level can be determined. Treatments in the policy table specify how an identified autonomous report is to be handled once a specified autonomous report is determined; the treatment indicates the handling of autonomous reporting by the device of a report having particular parameters/criteria. Treatments of an autonomous report are instructed by one or more of a reference NCF and an adjusted delta periodicity.

The time criticalness of the information being reported refers to the necessity of the information to operation of the IoT application. For example, the time criticalness of the information being reported can fall in three main time scales: mission critical, time critical, and delay tolerant. Mission critical information is essential to operation of the IoT application and thus has high priority. Time critical information must be received within a time certain for correct operation of the IoT application. Delay tolerant information means delay in reception of this information is acceptable to the IoT application. Additional or lesser levels of granularity may be utilized for scaling the time criticalness of information being reported. For example, there may be further levels of time critical information, such time critical for short, medium and long periods of time.

The reliability required for data being reported refers to the tolerance of the IoT application for a missed report. The reliability required for data being reported can fall into, for example, two categories: high reliability required and low reliability required. High reliability may be required in some cases where a missed report cannot be tolerated by the IoT application. In other low reliability cases, a missed report can be tolerated by the IoT application. Additional or lesser levels of granularity may be utilized for scaling the reliability required for data being reported. For example, the reliability required for data being reported may be ranked on a scale for 1 to 10, with 1 being the lowest and 10 being the highest reliability required for the data being reported.

The size of the data being reported can vary based on the type of autonomous report being transmitted. The data being reported can be as small a few bytes (e.g. a status report); or the data being reported can be large sized, such as a few Mbytes (e.g. vehicle driving log report). Additional or lesser levels of granularity may be utilized for scaling the size of the data being reported. For example, the size of the data being reported can be small, medium (e.g., Kbytes) and large and the like.

The device power level is the power level the device is required to use to transmit data on a given radio access technology. For example, high power may be required or low power may be required. Additional or lesser levels of granularity may be utilized for scaling the device power level. For example, there may also be a medium device power level or a number of levels of device power required and the like.

The reference network condition factor (reference NCF) is a treatment that indicates how the autonomous reporting should be treated with respect to a current network condition factor (current NCF). The reference NCF determines how a particular autonomous report is favored/disfavored under specified conditions. The reference NCF value is provided as part of a policy table that is provided to the IoT device while the current NCF value is provided to the IoT device in a signaling message. The reference NCF value is typically infrequently updated. Current conditions of the network(s) are synthesized into the current NCF of the network(s) and are reported to the IoT devices on a periodic basis (e.g., on the order of seconds, or faster). The current NCF is compared with the reference NCF in the policy table to determine treatment of a particular autonomous report identified based on parameters/criteria of the autonomous report. As an example, the values of Network Condition Factor can be on a scale ranging from 0, 1, 2, 3: three (3) being the most stringent/adversarial network condition and zero (0) being the least stringent/adversarial network condition for transmission of the autonomous report. Additional or lesser levels of granularity may be utilized for scaling the current NCF and reference NCF.

The adjusted delta periodicity is a treatment that defines a time offset for a particular type of autonomous report. Many autonomous reports from IoT devices will be sent at periodic intervals. Initially, IoT devices will have the periodicity of the particular autonomous reports pre-provisioned. Many non-time critical periodic reports have large timescales which are hourly, daily or weekly. It is possible that the varied periodicity of various autonomous reports may cause a large number of autonomous reports to attempt to utilize network resources at a same time. The value of adjusted delta periodicity in the policy table will initially be zero (0) since the pre-provisioned periodicity value will apply. However, based on patterns of periodic autonomous reporting and the number of devices involved in the reporting, the network can determine the impact on the network load conditions and resource utilization and adjust the adjusted delta periodicity to smooth utilization of network resources by the autonomous reports.

Input parameters/criteria identify a particular autonomous report. Treatment identifies the particular treatment of a respective report identified by the input parameters/criteria. Accordingly, the top row (first row) 102 of the policy table 100 indicates that power required to send data over the Long Term Evolution (LTE) network is low, power required to send data over the WiFi network is low, and time sensitivity is mission critical. The reliability and size of data input parameters are identified by a wildcard symbol (i.e., "*") which indicates that the parameter value is "don't care". For these input parameters, the treatment is the same for all possible values of the respective parameter such that autonomous reports need not be characterized by that input parameter in order to identify the desired treatment. While this example policy table considers only LTE and Wi-Fi access, similar policy can be configured for other access technologies like Long Range Wide-area network (LoRA) and Sig-Fox, which uses an ultra-narrow-band-based (UNB) radio technology.

The treatment of the autonomous report having the values of input parameters that match those of a row of the policy table, is identified by the reference NCF and the adjusted delta periodicity. For row one (1), the reference NCF is three (3) for an LET network and three (3) for a WiFi network. The adjusted delta periodicity is zero (0).

Similarly, the eighth row 104 of the policy table 100 indicates that power required to send data over the Long Term Evolution (LTE) network is high, power required to send data over the WiFi network is high, time sensitivity of the autonomous report is time critical, the reliability required of the autonomous report is high, and size of data of the autonomous report is low. The treatment of an autonomous report having the values of input parameters that match those of a row of the policy table, is identified by the reference NCF and the adjusted delta periodicity. For row eight (8), the reference NCF is two (2) for an LTE network and one (1) for a WiFi network. The adjusted delta periodicity is zero (0).

"N/A" indicates that the IoT device is not intelligent enough to discern the parameter/criteria value. Therefore, the last three rows 106 of the policy table 100 correspond to the cases when the device is not able to discern the values of most (all except "size of data") or all of the autonomous report parameters/criteria. It noted that if the IoT device is capable of only a single access technology, then the reference NCF of only that access technology will be applicable to the IoT device.

The policy table is an ordered list of policies that can be applied by the device based on the input parameters/criteria. The IoT device or user equipment will look for a match of the input parameters/criteria in the policy table with the corresponding current values starting from the row at the top and moving down the policy table until a match is found. Upon finding a matching set of input parameters, the device applies the treatment provided for by that row of the policy table. The initial policy table that is applied for the autonomous reporting can be communicated to the device as an Information Element (IE) in a Radio Resource Control (RRC) message.

The respective network has information on the number of devices that are reporting information. This can be used to fine tune the policy information and resend a new policy table to the IoT device as necessary. Recent information about different access network loads, measurement data of uplink transmission characteristics, and patterns of recent IoT requests from the IoT device can also be used to perform predictive adjustment of the policy information for a particular IoT device and the IoT device can be updated with that adjusted policy information. Changes in the policy table can be communicated to the IoT device as a communication update in a RRC message.

The current NCF is dynamically updated. The value of the current NCF is periodically (e.g., ~seconds) provided to the IoT device so that the appropriate treatment can be applied at the time when the autonomous report occurs. If the value of the reference NCF that is included in the row of the policy table that matches current input parameters/criteria (i.e., device power required to send data, time sensitivity, reliability, and size of data) is equal to or more than the value of the current NCF, then the IoT device is permitted to request to send the uplink data. Otherwise (i.e., the reference NCF value <current NCF value), the device will wait for the next current NCF update to check whether network conditions and the policy table permit a request for the sending of the data of the autonomous report.

The value of the current NCF is computed and can be sent to the device on a periodic basis (e.g., ~seconds) in a System Information Block (SIB) message or a RRC message. One method for sending a NCF having four levels (ranging over values 1-3) is to utilize two (2) bits in an existing SIB message.

The current NCF is a function of the current network load (CNL), number of devices (nD) on that cell (LTE)/access point (WiFi)/etc., and reporting pattern (RP) of recent IoT requests from the devices. This relation may be expressed as NCF=f(CNL, nD, RP). The CNL is network specific.

The current network load (CNL) is computed using the following parameters:
a=the number of connected users,
b=the number of connected machine type communication (MTC) users;
c=downlink/uplink physical resource block consumption (DL/UL PRB consumption) (that is shared with MTC),
d=MTC DL/UL PRB consumption; and
e=cost of transmission.

The above parameters can be used to compute the load on the LTE eNB:

$$CNL=\text{Max}(a/A, b/B, c/C, d/D, e/E)$$

where a, b, c, d, e are the current values and
A, B, C, D, E are the respective MAX values of these same parameters.

The number of devices (nD) is equivalent to the number of IoT devices actively sending data using that access technology during the last n (e.g., tunable integer value) interval.

The reporting pattern (RP) is a value assigned for IoT reporting occurring over the last x (e.g., tunable integer value) interval (e.g., x days). For example, frequent and rapid, short communications from many devices can denote a lot of IoT devices are chatty. For example, a small number of IoT devices reporting over the interval can indicate a lack of activity in that area. For example, reporting by a large number of IoT devices at regular interval can be used to establish a predictable pattern that can be utilized to adjust the reference NCF and adjusted delta periodicity.

As mentioned above, the current NCF for a respective cell/access point is a function of the CNL, nD on the respective cell/access point, and the RP of recent IoT requests from the devices. The functional relationship between NCF and its input parameters can be further detailed. The higher the CNL, the higher is the value of the NCF. The higher the nD, the higher is the value of the NCF. A predictable pattern of reporting by a large number of devices at regular interval helps to adjust the NCF; for example, during those intervals of usually large number of autonomous reports, the value of the NCF may not be reduced even if the number of reports transmitted may decrease for a short period.

Based on the periodic patterns of reporting from the various devices, it may be possible to modify the adjusted delta periodicity. For example, it is possible to "learn" that a large number of IOT devices are reporting and thus scheduled at the same time. This can be accomplished by finding activity during a time frame and discovering a pattern in activity reporting levels. For example, the network load can spike at a given time. If the reports causing the network load to spike are non-time critical reporting, the periodicity may be adjusted by a small delta on a group of devices so as to stagger the reporting sufficiently to ensure the network is not overloaded. "Adjusted delta periodicity" can be expressed as an absolute time or a relative value. For example, if the adjusted delta periodicity is expressed as an absolute value it may be expressed as a specified time such as a specified time of the day or day of week. Expressed as a relative value, the adjusted delta periodicity may be expressed as a relative value with respect to another event (such as, the pre-programmed time on the device to transmit the autonomous data, the time when the cost of transmission goes down, and the like). The relative time can be a fraction of a specified time where the fraction can be determined by the device by either using a hashing function on its International Mobile Subscriber Identity (IMSI) or by generating a random number and then dividing the resultant number by its maximum possible value and the like. The relative time can be utilized to shift the reporting time of an autonomous report.

The exemplary policy table along with the computation of the current NCF favors transmission of UL data from the IoT devices when the user equipment (UE) power needed to send the data is lower, at the same time ensuring that the load on the network is manageable. This results in reduction of battery consumption of devices, efficient utilization of network resources, avoidance of network overload conditions and better QoE of non-IoT applications. The policy table takes into consideration all these application characteristics of the IoT data to be sent in an autonomous report and ensures better QoE of IoT applications. While automatic tuning of the policy table allows for hands off control and management of autonomous reporting, the network operator may also override the default policy table.

FIG. 2 is a block diagram of a cellular network 200 in accordance with some embodiments. WiFi access point 202 provides the air interface for a WiFi compliant device 204 to connect to a wired network. LTE eNb 206 provides the air interface for an LTE compliant device 204 to connect to the wired network. Communication device 204 is a multi-access technology device, both W-Fi and LTE compliant. WiFi access point 202 and LTE eNb 206 are associated with a Mobile Edge Computing (MEC) device 208. The MEC 208 provides the link between the mobile network and the telecommunication cloud including application servers 210. The MEC 208 also implements a LoRA gateway 212 to provide access to the telecommunication cloud to LoRA enabled devices 214. The MEC 208 may also include a SigFox gateway (not shown) for connection to SigFox compliant devices (not shown).

A logical entity, named herein a Dynamic Policy based Control for Autonomous Transmission (DPCAT) 216, is instantiated on the MEC 208. The DCPAT 216 permits the provisioning of the initial configuration of the policy table to be provided to the communication devices 204, 214 (e.g., IoT devices). The DCPAT 216 on the MEC 208 also updates the policy table as and when certain network conditions change, as discussed above. For example, the DCPAT 216 may be used to change the reference network condition factor (NCF) and adjusted delta periodicity. The adjusted delta periodicity and the reference NCF may be adapted based on activities in the network and the "learned" patterns of IoT traffic. The DCPAT 216 also computes the current NCF and sends a periodic (e.g., on the order of secs) update to the IoT devices of the current NCF. The DPCAT 216 can reside on MEC 208 and orchestrate the configuring and dynamic adjustment of the policy. It can also be standalone and/or be instantiated on another network element in the network.

Figure 4:
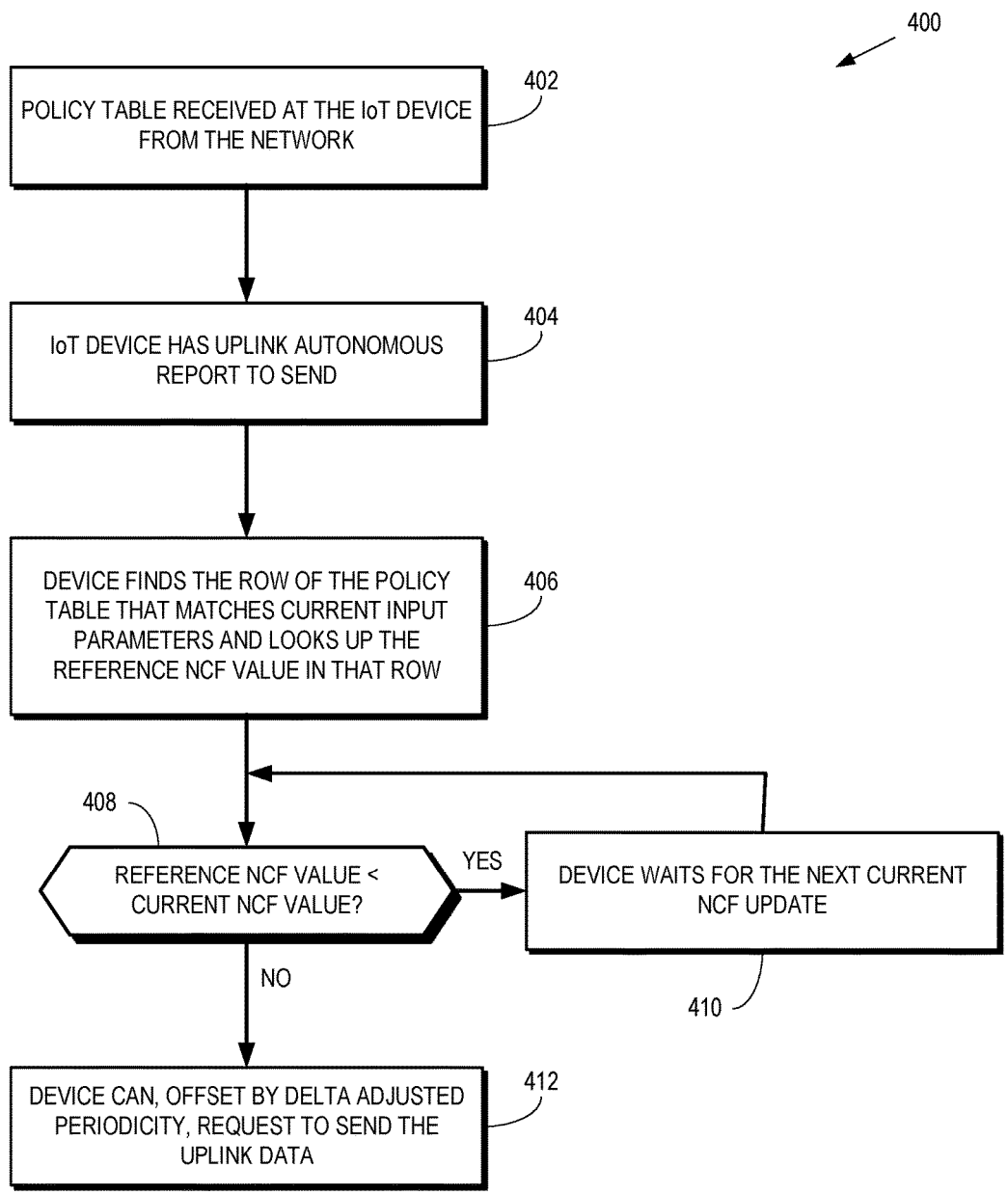
FIG. 4 is an example flow chart depicting the methodology of a Dynamic Policy based Control for Autonomous Transmission (DPCAT) configured on a IoT device in accordance with some embodiments.

Corresponding DPCATs 218, 220 at the communication devices 204, 214 receive initial and updated configurations of the policy table and periodic updates of the current NCF in order to be able to send autonomous reports according to the methodology further describe with respect to FIG. 4

Figure 3:
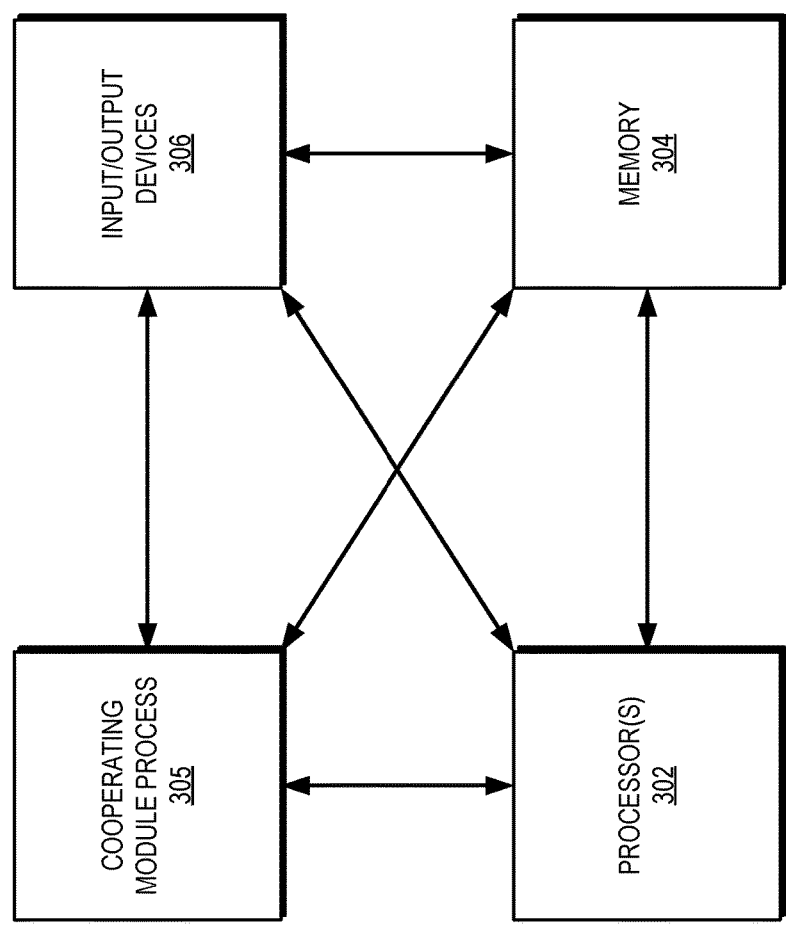
FIG. 3 depicts a high-level block diagram of a computing device suitable for use in various embodiments.

FIG. 3 depicts a high-level block diagram of a computing device suitable for use in various embodiments. As depicted in FIG. 3, computing device 300 includes a processor element 302 (e.g., a central processing unit (CPU) and/or other suitable processor(s)), a memory 304 (e.g., random access memory (RAM), read only memory (ROM), and the like), cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like).

In the case of a routing or switching device such as an IoT device, UE, WiFI access point, eNb, MEC and the like, the cooperating module process 305 may implement various switching devices, routing devices, interface devices and so on as known to those skilled in the art. Thus, the computing device 300 is implemented within the context of such a routing or switching device (or within the context of one or more modules or sub-elements of such a device), further functions appropriate to that routing or switching device are also contemplated and these further functions are in communication with or otherwise associated with the processor 302, input-output devices 306 and memory 304 of the computing device 300 described herein.

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 305 can be loaded into memory 304 and executed by processor 302 to implement the functions as discussed herein. Thus, cooperating process 305 (including associated data structures) can be stored on a computer readable storage medium, e.g., RAM memory, magnetic or optical drive or diskette, and the like.

It will be appreciated that computing device 300 depicted in FIG. 3 provides a general architecture and functionality suitable for implementing functional elements described herein or portions of the functional elements described herein.

It is contemplated that some of the steps further discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various embodiments contemplate an apparatus including a processor and memory, where the processor is configured to receive via an interface at least one current network condition factor (NCF), a respective one of at least one current NCF indicating a level of congestion of a corresponding network; determine that there is an autonomous report to be transmitted; in response to determining that there is an autonomous report to transmit, determine a policy entry of a policy used for autonomous reporting based on matching values of one or more input parameters related to the autonomous report to values of one or more input parameters of the policy entry; determine a reference NCF for a first network, the reference NCF for the first network corresponding to the policy entry; and determine whether to request to transmit the autonomous report on the first network based on a comparison of the reference NCF for the first network and the current NCF of the first network. The processor is configured to perform the various functions as described, as well communicate with other entities/apparatus including respective processors and memories to exchange control plane and data plane information in accordance of the various embodiments.

FIG. 4 is an example flow chart depicting the methodology 400 of the DCPAT configured on a IoT device in accordance with some embodiments. At block 402, the IoT device receives a policy table. For instance, FIG. 5 is an example policy table 500 configured on a Long Range Wide-area (LoRa) device in accordance with some embodiments and which may be configured on an IoT device according to the method of FIG. 4. As before with respect to FIG. 1, the policy table 500 shown in FIG. 5 includes the parameters/criteria of: criticalness of the information being reported, reliability required for the data being reported, size of the data being reported, and device power level required to send the autonomous report. When an autonomous report is to be transmitted, a certain time criticalness of the information being reported, a certain reliability required for the data being reported, a certain size of the data being reported, and a certain device power level can be determined. Treatments in the policy table specify how an identified autonomous report is to be handled once a specified autonomous report is determined; the treatment indicates the handling of autonomous reporting by the device of a report having particular parameters/criteria. Treatments of an autonomous report are instructed by \ a reference network condition factor (NCF) and an adjusted delta periodicity.

Input parameters/criteria identify a particular autonomous report. Treatment identifies the particular treatment of a respective report identified by the input parameters/criteria. Accordingly, the top row (first row) 502 of the policy table 500 indicates that power required to send data over the LoRa network is low and time sensitivity is mission critical. The reliability and size of data input parameters are identified by a wildcard symbol (i.e., "*") which indicates that the parameter value is "don't care". For these input parameters, the treatment is the same for all possible values of the respective parameter such that autonomous reports need not be characterized by the input parameter in order to identify the desired treatment.

The treatment of the autonomous report having the values of input parameters that match those of a row of the policy table, is identified by the reference NCF and the adjusted delta periodicity. For row one (1), the reference NCF is three (3) and the adjusted delta periodicity is zero (0).

Similarly, the eighth row 504 of the policy table 500 indicates that power required to send data over the LoRa network is high, time sensitivity of the autonomous report is time critical, the reliability required of the autonomous report is low, and size of data of the autonomous report is "don't care". The treatment of the autonomous report having the values of input parameters that match those of a row of the policy table, is identified by the reference NCF and the adjusted delta periodicity. For row eight (8), the reference NCF is one (1) for the LoRa network and the adjusted delta periodicity is zero (0).

"N/A" indicates that the IoT device is not smart enough to discern the parameter/criteria value. Therefore, the last three rows 506 of the policy table 500 correspond to the cases when the device is not able to discern the values of most (all except "size of data") or all of the autonomous report parameters/criteria.

Returning to FIG. 4, at block 404, IOT device determines that it has uplink autonomous report to send.

At block 406, the IoT device finds the row of the policy table that matches current input parameters and looks up the reference NCF value in that row. In response to determining that there is an autonomous report to transmit at the device, the device determines a policy entry of a policy used for autonomous reporting based on matching values of one or more input parameters related to the autonomous report to values of one or more input parameters of the policy entry. The IoT device then determines a reference NCF value for a first network, the reference NCF value for the first network corresponding to the policy entry.

At block 408, the IoT device determines whether the reference NCF value is greater than or equal to the current NCF value. The device determines whether to request to transmit the autonomous report on the first network based on a comparison of the reference NCF value for the first network and the current NCF of the first network.

If the reference NCF value is not greater than or equal to the current NCF value, i.e., the reference NCF value is less than the current NCF value, at block 410 the IoT device waits for the next current NCF update to arrive from the network and then again determines whether the reference NCF value is greater than or equal to the current NCF value at block 408.

If the reference NCF value is greater than or equal to the current NCF value, at block 412 the IoT device can, offset by delta adjusted periodicity, request to send the uplink data.

A couple of examples will further detail the methodology according to some embodiments. In a first example, assume that there is a first device 204 that is capable of multiple access technologies (e.g., Wi-Fi and LTE). On the network side, the DPCAT function 216 running on the MEC 208 computes and configures a default policy table on a first device. The policy table is sent to the first device in a RRC message. In this first example, the policy table configured on the multiple access technologies device (e.g., a Wi-Fi and LTE device) is the policy table of FIG. 1.

On the network side, the DPCAT function 216 at the MEC 208 computes the current NCF for the LTE network and the WiFi network. Suppose that the current NCF values are calculated to be two (2) and two (2) for the LTE network and the WiFi network respectively for this interval (intervals may be, for example. in seconds). The current NCF values are sent to the first device in a System Information Block (SIB) message.

The corresponding DCPAT 218 on the first device 204 receives the current NCF values for the LTE network and the WiFi network. If the first device were a single technology device, the first device may only receive the current NCF value for that wireless technology. Accordingly, the IoT device receives, at least one current network condition factor (NCF), respective ones of at least one current NCF indicating a level of congestion of a corresponding network calculated as discussed above.

Then, a non-time critical autonomous report needs to be sent from the first device. The parameters/criteria of the autonomous transmission contemplated matches the entry in the policy table of FIG. 1 illustrated in FIG. 6. Accordingly, FIG. 6 is a portion 600 of an example policy table matching the input parameters of an autonomous report to be in accordance with some embodiments. That is, for this particular autonomous report contemplated, the power required to send data over the LTE network is low, the power required to send data over the WiFi network is low, the time sensitivity of the autonomous report is non-time critical, the reliability required of the autonomous report may be high or low, and size of data of the autonomous report is low. The treatment of the autonomous report having these input parameters/criteria is indicated by the reference NCF of two (2) for LTE network, reference NCF of one (1) for the WiFi network, and adjusted delta periodicity of zero (0).

Based on whether the reference NCF value is greater than or equal to the current NCF value, the IoT device determines whether to proceed with requesting transmission of the autonomous report. If the reference NCF value is greater than or equal to the current NCF value, the IoT device can, offset by delta adjusted periodicity, request to send the uplink data. If the reference NCF value is not greater than or equal to the current NCF value, the IoT device waits for the next current NCF update to arrive from the network before checking again whether to proceed with requesting transmission of the autonomous report. In this example, since the current NCF values reported are two (2) for LTE and two (2) for WiFi and the reference NCF values in the policy table entry of FIG. 6 are two (2) for LTE and one (1) for LTE, the autonomous transmission is permitted to proceed on LTE optionally offset by the adjusted delta periodicity and not permitted to proceed on Wi-Fi.

In a second example, again assume that there is a first device that is capable of multiple access technologies (e.g., Wi-Fi and LTE). On the network side, the DPCAT function running on the MEC computes and configures a default policy table on the first device. The policy table is sent to the first device in a RRC message. In this second example, the policy table configured on the multiple access technologies device (e.g., a Wi-Fi and LTE device) is the policy table of FIG. 1.

On the network side, the DPCAT function at the MEC computes the current NCF for the LTE network and the WiFi network. Suppose that the current NCF values are calculated to be three (2) and two (2) for the LTE network and the WiFi network respectively for this interval (intervals may be, for example. in seconds). The current NCF values are sent to the first device in a System Information Block (SIB) message.

The corresponding DCPAT on the first device receives the current NCF values for the LTE network and the WiFi network. Then, one time-critical autonomous report and another non-time critical autonomous report need to be sent from the first device. The parameters/criteria of the autonomous transmissions contemplated match the entries in the policy table of FIG. 1 illustrated in FIG. 7. Accordingly, FIG. 7 is a portion 700 of an example policy table matching the input parameters of an autonomous report to be in accordance with some embodiments. That is, for a time-critical autonomous report contemplated, the power required to send data over the LTE network is low, the power required to send data over the WiFi network is high, the reliability required of the autonomous report is high, and size of data of the autonomous report is low. The treatment of the autonomous report having these input parameters/criteria is indicated by the reference NCF of three (3) for LTE network, reference NCF of one (1) for the WIFI network, and adjusted delta periodicity of zero (0). That is, for non-time-critical autonomous report contemplated, the power required to send data over the LTE network is low, the power required to send data over the WiFi network is low, the reliability required of the autonomous report may be high or low, and size of data of the autonomous report is low. The treatment of the autonomous report having these input parameters/criteria is indicated by the reference NCF of two (2) for LTE network, reference NCF of one (1) for the WiFi network, and adjusted delta periodicity of zero (0).

Based on whether the reference NCF value is greater than or equal to the current NCF value, the IoT device determines whether to proceed with requesting transmission of the autonomous report. If the reference NCF value is greater than or equal to the current NCF value, the IoT device can, offset by delta adjusted periodicity, request to send the uplink data. If the reference NCF value is not greater than or equal to the current NCF value, the IoT device waits for the next current NCF update to arrive from the network before checking again whether to proceed with requesting transmission of the autonomous report. In this example, since the current NCF values reported are three (3) for LTE and three (3) for WiFi and the reference NCF values in the time critical entry of FIG. 7 are three (3) for LTE and one (1) for LTE, the time critical autonomous transmission is permitted to proceed on LTE optionally offset by the adjusted delta periodicity and not permitted to proceed on Wi-Fi. In this case the adjusted delta periodicity is zero (0) so there is no time offset of the request for network resources. For the non-time critical entry, the value of the reference NCF of FIG. 7 is two (2) for LTE and one (1) for WiFi. Therefore, since the current NCF values reported are three (3) for LTE and three (3) for WiFi this non-time critical autonomous transmission is not permitted to proceed on both LTE and WiFi. The device will wait for the next NCF report before proceeding to again determine whether this non-time critical data transmission can proceed.

In one embodiment, a method includes receiving, at a device, at least one current network condition factor (NCF)

value, a respective one of at least one current NCF value indicating a level of congestion of a corresponding network. The method further includes determining, at the device, that there is an autonomous report to be transmitted, in response to determining that there is an autonomous report to transmit at the device, determining, at the device, a policy entry of a policy used for autonomous reporting based on matching values of one or more input parameters related to the autonomous report to values of one or more input parameters of the policy entry, and determining, at the device, a reference NCF value for a first network, the reference NCF value for the first network corresponding to the policy entry. The method further includes requesting, at the device, to transmit the autonomous report on the first network based on a comparison of the reference NCF value for the first network and the current NCF value of the first network.

In one embodiment, the method includes receiving, at the device, the policy used for autonomous reporting by the device, the policy having a plurality of entries relating a plurality of input parameters concerning a respective autonomous report to treatment for transmission of the respective autonomous report.

In one embodiment, the treatment for transmission of the policy entry includes a plurality of reference NCF values for a corresponding plurality of networks.

In one embodiment, the treatment for transmission of the policy entry further includes an adjusted change of periodicity indicating a time shift for the autonomous report.

In one embodiment, the method further includes modifying the adjusted change of periodicity based on patterns of periodic autonomous reporting and a number of devices involved in the reporting.

In one embodiment, the input parameters of the policy entry include a power level required of the device to send a transmission on a corresponding network, a time sensitivity of the autonomous report, a reliability required of the autonomous report, and a size of data of the autonomous report.

In one embodiment, the first network may be a Long Term Evolution (LTE) network, a WiFi network, a Long Range Wide Area (LoRA) network, or a SigFox network.

In one embodiment, the requesting includes requesting to transmit the autonomous report when the reference NCF value of the first network is greater than or equal to the current NCF value of the first network.

In one embodiment, the requesting includes abstaining from requesting to transmit the autonomous report for a time interval when the reference NCF value of the first network is less than the current NCF value of the first network.

In one embodiment, the device is an Internet of Things (IoT) device or a user equipment.

In one embodiment, the method of claim 1 further includes transmitting the autonomous report on the first network.

In one embodiment, the current NCF value is a function of a current network load of the corresponding network, a number of devices on a cell to which the device is connected, and a reporting pattern of recent Internet of Things (IoT) requests for network resources.

In yet another embodiment, an apparatus comprises an interface to one or more networks and a processor. The processor is configured to receive via the interface at least one current network condition factor (NCF) value, a respective one of at least one current NCF value indicating a level of congestion of a corresponding network; determine that there is an autonomous report to be transmitted; in response to determining that there is an autonomous report to transmit, determine a policy entry of a policy used for autonomous reporting based on matching values of one or more input parameters related to the autonomous report to values of one or more input parameters of the policy entry; determine a reference NCF value for a first network, the reference NCF value for the first network corresponding to the policy entry; and request to transmit the autonomous report on the first network based on a comparison of the reference NCF value for the first network and the current NCF value of the first network.

In one embodiment, the processor is further configured to receive the policy used for autonomous reporting, the policy having a plurality of entries relating a plurality of input parameters concerning a respective autonomous report to treatment for transmission of the respective autonomous report.

In one embodiment, the treatment for transmission of the policy entry comprises: a plurality of reference NCF values for a corresponding plurality of networks.

In one embodiment, the treatment for transmission of the policy entry further comprises an adjusted change of periodicity indicating a time shift for the autonomous report.

In one embodiment, the processor is further configured to modify the adjusted change of periodicity based on patterns of periodic autonomous reporting and a number of devices involved in the reporting.

In one embodiment, the input parameters of the policy entry comprise a power level required of the apparatus to send a transmission on a corresponding network, a time sensitivity of the autonomous report, a reliability required of the autonomous report, and a size of data of the autonomous report.

In one embodiment, the one or more networks is one or more of a Long Term Evolution (LTE) network, a WiFi network, a Long Range Wide area (LoRA) network, or a SigFox network.

In one embodiment, the processor is configured to request to transmit the autonomous report when the reference NCF value of the first network is greater than or equal to the current NCF value of the first network.

In one embodiment, the processor is configured to abstain from requesting to transmit the autonomous report for a time interval when the reference NCF value of the first network is less than the current NCF value of the first network.

In one embodiment, the apparatus is an Internet of Things (IoT) device or a user equipment.

In one embodiment, the processor is further configured to transmitting the autonomous report on the first network.

In one embodiment, the current NCF value is a function of a current network load of the corresponding network, a number of devices on a cell to which the device is connected, and a reporting pattern of recent Internet of Things (IoT) requests for network resources.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a device, at least one current network condition factor (NCF), a respective one of the at least one current NCF indicating a level of congestion of a corresponding network;
   determining, at the device, that there is an autonomous report to be transmitted;
   receiving, at the device, a policy used for autonomous reporting by the device, the policy having a plurality of entries relating a plurality of input parameters concerning a respective autonomous report to treatment for transmission of the respective autonomous report;
   in response to determining that there is an autonomous report to transmit at the device, determining, at the device, a policy entry of the policy used for autonomous reporting based on matching values of one or more input parameters related to the autonomous report to values of one or more input parameters of the policy entry;
   determining, at the device, a reference NCF for a first network, the reference NCF for the first network corresponding to the policy entry; and
   requesting, at the device, to transmit the autonomous report on the first network based on a comparison of the reference NCF for the first network and the current NCF of the first network.

2. The method of claim 1, wherein the treatment for transmission of the policy entry comprises:
   a plurality of reference NCFs for a corresponding plurality of networks.

3. The method of claim 2 wherein the treatment for transmission of the policy entry further comprises:
   an adjusted change of periodicity indicating a time shift for the autonomous report.

4. The method of claim 3, further comprising:
   modifying the adjusted change of periodicity based on patterns of periodic autonomous reporting and a number of devices involved in the reporting.

5. The method of claim 1 wherein the input parameters of the policy entry comprise:
   a power level required of the device to send a transmission on a corresponding network, a time sensitivity of the autonomous report, a reliability required of the autonomous report, and a size of data of the autonomous report.

6. The method of claim 1 wherein the first network is a Long Term Evolution (LTE) network, a WiFi network, or a Long Range Wide Area (LoRA) network.

7. The method of claim 1 wherein the requesting comprises:
   requesting to transmit the autonomous report when the reference NCF of the first network is greater than or equal to the current NCF of the first network; and
   abstaining from requesting to transmit the autonomous report for a time interval when the reference NCF of the first network is less than the current NCF of the first network.

8. The method of claim 1 further comprising transmitting the autonomous report on the first network.

9. The method of claim 1 wherein the current NCF is a function of a current network load of the corresponding network, a number of devices on a cell to which the device is connected, and a reporting pattern of recent Internet of Things (IoT) requests for network resources.

10. An apparatus comprising:
    an interface to one or more networks;
    a processor configured to
    receive via the interface to at least one current network condition factor (NCF), a respective one of at least one current NCF indicating a level of congestion of a corresponding network;
    determine that there is an autonomous report to be transmitted;
    receive a policy used for autonomous reporting, the policy having a plurality of entries relating a plurality of input parameters concerning a respective autonomous report to treatment for transmission of the respective autonomous report;

in response to determining that there is an autonomous report to transmit, determine a policy entry of the policy used for autonomous reporting based on matching values of one or more input parameters related to the autonomous report to values of one or more input parameters of the policy entry;

determine a reference NCF for a first network, the reference NCF for the first network corresponding to the policy entry; and request to transmit the autonomous report on the first network based on a comparison of the reference NCF for the first network and the current NCF of the first network.

11. The apparatus of claim 10, wherein the treatment for transmission of the policy entry comprises:

a plurality of NCFs for a corresponding plurality of networks.

12. The apparatus of claim 11 wherein the treatment for transmission of the policy entry further comprises:

an adjusted change of periodicity indicating a time shift for the autonomous report.

13. The apparatus of claim 12, wherein the processor is configured to modify the adjusted change of periodicity based on patterns of periodic autonomous reporting and a number of devices involved in the reporting.

14. The apparatus of claim 10 wherein the input parameters of the policy entry comprise:

a power level required of the apparatus to send a transmission on a corresponding network, a time sensitivity of the autonomous report, a reliability required of the autonomous report, and a size of data of the autonomous report.

15. The apparatus of claim 10 wherein the one or more networks is one or more of a Long Term Evolution (LTE) network, a WiFi network, or a Long Range Wide area (LoRA) network.

16. The apparatus of claim 10 wherein the processor is configured to:

request to transmit the autonomous report when the reference NCF of the first network is greater than or equal to the current NCF of the first network; and abstain from requesting to transmit the autonomous report for a time interval when the reference NCF of the first network is less than the current NCF of the first network.

17. The apparatus of claim 10 wherein the processor is further configured to transmit the autonomous report on the first network.

18. The apparatus of claim 10 wherein the current NCF is a function of a current network load of the corresponding network, a number of devices on a cell to which the device is connected, and a reporting pattern of recent Internet of Things (IoT) requests for network resources.

* * * * *